United States Patent
Honkasalo

(10) Patent No.: US 6,510,148 B1
(45) Date of Patent: *Jan. 21, 2003

(54) SELECTIVE DISCONTINUOUS TRANSMISSION FOR HIGH SPEED DATA SERVICES IN CDMA MULTI-CHANNEL CONFIGURATION

(75) Inventor: Zhichun Honkasalo, Bedford, TX (US)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/694,698

(22) Filed: Oct. 23, 2000

Related U.S. Application Data

(63) Continuation of application No. 08/882,822, filed on Jun. 26, 1997, now Pat. No. 6,137,789.

(51) Int. Cl.[7] .............................................. H04B 7/216
(52) U.S. Cl. ........................................ 370/342; 370/465
(58) Field of Search ................................ 370/332, 335, 370/342, 465, 468, 318, 252; 375/286, 287; 455/69, 70, 450, 455, 522

(56) References Cited

U.S. PATENT DOCUMENTS

| | | | | |
|---|---|---|---|---|
| 5,257,257 A | * | 10/1993 | Chen et al. ................. | 370/441 |
| 5,583,851 A | * | 12/1996 | Kato et al. .................. | 370/342 |
| 5,603,096 A | * | 2/1997 | Gilhousen et al. ........... | 455/69 |
| 5,629,934 A | * | 5/1997 | Ghosh et al. ............... | 370/335 |
| 5,708,656 A | * | 1/1998 | Noneman et al. ........... | 370/335 |
| 5,777,990 A | * | 7/1998 | Zehavi et al. ............... | 370/335 |
| 5,790,533 A | * | 8/1998 | Burke et al. ................ | 370/318 |
| 5,793,744 A | * | 8/1998 | Kanerva et al. ............. | 370/209 |
| 5,812,968 A | * | 9/1998 | Hassan et al. ............... | 704/221 |
| 5,822,318 A | * | 10/1998 | Tiedemann et al. ......... | 370/391 |
| 5,839,056 A | * | 11/1998 | Hakkinen ..................... | 455/69 |
| 5,870,378 A | * | 2/1999 | Huang et al. ................ | 370/209 |
| 5,870,393 A | * | 2/1999 | Yano et al. .................. | 370/335 |
| 5,881,368 A | * | 3/1999 | Grob et al. .................. | 455/522 |
| 5,884,187 A | * | 3/1999 | Ziv et al. ..................... | 455/522 |
| 5,946,356 A | * | 8/1999 | Felix et al. .................. | 375/295 |
| 6,137,789 A | * | 10/2000 | Honkasalo ................... | 370/342 |

* cited by examiner

*Primary Examiner*—Chau Nguyen
*Assistant Examiner*—Jasper Kwoh
(74) *Attorney, Agent, or Firm*—Harry F. Smith; Brian T. Rivers

(57) ABSTRACT

This invention applies to a mobile station that is able to determine a required data rate based on data buffer usage. If the data buffer indicates a requirement for a high data rate transmission, the mobile station sends a request to a base station to be assigned multiple parallel code channels. If the multiple parallel code channels are granted, the mobile station uses the channels for transmitting data to the base station until either the data buffer becomes empty, or a base station time-out occurs, or the mobile station is signalled by the base station to reduce its data transmission rate, whichever occurs first. The mobile station of this invention is enabled to autonomously control the data rate during an assigned period for high speed transmission, so as to lower the data rate when needed for the purpose of improving coverage and/or to avoid operating in a power limited condition, thereby degrading link quality. The data rate is lowered by disabling transmission though at least one parallel code channel, and subsequently resuming transmission though the code channel when conditions warrant. This provides a discontinuous transmission (DTX) mode of operation for individual ones of supplemental parallel data code channels.

8 Claims, 4 Drawing Sheets

SELECTIVE DISCONTINUOUS TRANSMISSION FOR HIGH SPEED DATA SERVICES IN CDMA MULTI-CHANNEL CONFIGURATION

FIELD OF THE INVENTION

This is a Continuation of U.S. patent application Ser. No. 08/882,822 filed Jun. 26, 1997, entitled "MOBILE STATION EMPLOYING SELECTIVE DISCONTINUOUS TRANSMISSION FOR HIGH SPEED DATA SERVICES IN CDMA MULTI-CHANNEL REVERSE LINK CONFIGURATION" now U.S. Pat. No. 6,137,789.

This invention relates generally to radiotelephones and, in particular, to radiotelephones or mobile stations such as those capable of operation with a code division, multiple access (CDMA) cellular network.

BACKGROUND OF THE INVENTION

Advances in the field of telecommunications have resulted in a variety of types of telecommunications systems being available for use by the general public. Among these telecommunications systems, cellular telephone systems are presently one of the most rapidly developing in terms of technologies and services offered. Cellular systems are currently in widespread use worldwide, with continued growth in sales and subscribers predicted for the future.

Several types of technologies have become dominant in the cellular industry. In the United States most cellular systems currently operating use analog signal transmission techniques, as specified by the Telecommunications Industry Association/Electronic Industry Association(TIA/EIA) AMPS standard, or a combination of analog and time division multiple access (TDMA) signal transmission techniques, as specified by the TIA/EIA IS-54 and IS-136 standards. In Europe, cellular systems may operate according to one of several analog system standards, depending on the country, or according to the digital Global Services for Mobile (GSM) TDMA standard that has been specified for Europe. In other parts of the world most cellular systems operate according to one of the standards used in the United States or Europe, except for in Japan where the TDMA personal digital communication (PDC) standard has been developed and is in use. However, in spite of the present dominance of analog and TDMA technologies, the cellular industry is dynamic and new technologies are constantly being developed as alternatives to these currently dominant technologies. One alternative digital signal transmission technique that has recently been the focus of interest for cellular systems is known as code division multiple access (CDMA). In a CDMA system multiple users, each using a channel identified by a uniquely assigned digital code, communicate with the system while sharing the same wideband frequency spectrum.

CDMA provides several advantages over conventional analog or TDMA systems. Frequency spectrum allocation planning for mobile stations and the base stations of cells within a CDMA system is not necessary, as in analog and TDMA systems, because all CDMA base stations share the entire downlink frequency spectrum, and all mobiles share the entire uplink frequency spectrum. The fact that the wideband frequency spectrum is shared by all uplink or downlink users in CDMA also increases capacity since the number of users that can be multiplexed simultaneously is limited by the number of digital codes available to identify the unique communications channels of the system, not by the number of radio frequency channels available. Additionally, since the energy of the transmitted signals are spread over the wide band uplink or downlink frequency band, selective frequency fading does not affect the whole CDMA signal. Path diversity is also provided in a CDMA system. If multiple propagation paths exist, they can be separated as long as the differences in paths delays does not exceed 1/BW, where BW equals the bandwidth of the transmission link. An example of a widely accepted cellular system CDMA standard is the TIA/EIA IS-95-A system standard.

Because data transmission applications other than conventional voice traffic transmission are becoming increasingly important in the cellular system area, a system operator who operates a CDMA system may desire to provide services other than phone voice service. Examples of these other services include portable computer cellular modem service or video service. Often, these other services may require that data be transmitted at a rate much faster than that required for voice transmission.

In the case where it is desired to provide a range of different services in a CDMA cellular system, a method and apparatus for varying the data transmission rate in the system, where the data rate could vary within a range required for all system services, must be provided. It would be desirable that this apparatus provide both slower speed data transmission for efficient and reliable speech service and high speed data transmission for other applications. For example, the IS-95-A system is limited to a maximum data rate of 9600 bits per second (9.6 kbps). However, it may be desirable to provide services in the IS-95-A system that require data transmission at rates greater than 9.6 kbps. Additionally, because of the large costs involved in developing new systems, it would also be desirable if the data transmission apparatus could be operated within an existing system on a noninterfering basis with slower speed transmitters and receivers, and could be implemented with minimum modifications to the air interface of the existing system.

One technique for providing a higher data rate is to use multiple, parallel data channels that are simultaneously transmitted between the mobile station and the base station. In this case the parallel data channels are separated by unique spreading codes. A high speed data user is assigned one fundamental code channel, and one or more supplemental code channels. The fundamental code channel is assigned for the duration of the connection time, and is used for data traffic and signalling, while the one or more supplemental code channels are assigned for all or a portion of the connection time, and are dedicated for high speed data (HSD) traffic.

However, one significant problem with high speed data transmission in the CDMA reverse link (mobile station to base station), when using such a multiple parallel traffic (code) channel configuration, relates to the mobile station power amplifier (PA) efficiency. This is due to the fact that the addition of the sub-channel modulated waveforms results in a higher peak to average ratio of the transmitted signal, and thus additional backoff in the power amplifier in order to maintain the required linearity. Consequently the mobile station is constrained to deliver lower output power, compared to a single channel signal of the same data rate. When the mobile station reaches its peak transmitter power the connection quality can no longer be maintained, despite the base station commanding a further increase in transmitted power. This can lead to an excessive number of high error frames and a possible drop of the connection.

OBJECTS OF THE INVENTION

It is thus a first object of this invention to provide an improved method for operating a mobile station at an increased effective data rate, without increasing the required linearity of the mobile station's output power amplifier.

It is another object of this invention to provide a mobile station that operates with a fundamental and at least one supplemental code (data) channel, and to enable the supplemental code channel to be selectively placed in a discontinuous transmission (DTX) state (a DTX low state) based on the occurrence of at least one criterion being fulfilled.

It is a further object of this invention to provide a mobile station that operates with the fundamental and the at least one supplemental code channel, and to enable the supplemental code channel to be selectively placed in the DTX low state if a commanded transmitter power increase would cause the mobile station to exceed its output power limit.

SUMMARY OF THE INVENTION

The foregoing and other problems are overcome and the objects of the invention are realized by methods and apparatus in accordance with embodiments of this invention.

To overcome the foregoing and other problems, the mobile station is operated so as to autonomously reduce its transmission data rate by lowering the number of parallel code channels in use, and/or by reducing the data transmission rate through a code channel. By so doing the mobile station is enabled to improve the link budget and increase the backoff in the power amplifier, while at the same time delivering more output power if required by the base station, thereby maintaining the connection quality at the expense of the user transmission data rate.

An important advantage that accrues from the use of this invention is an improvement in the reverse link coverage for power limited, high speed data terminals, at least to the extent that the traffic channel connection can be maintained at a lower data rate.

This invention applies to a mobile station that is able to determine a required data rate based on data buffer usage. That is, if the data buffer indicates a requirement for a high data rate transmission, the mobile station sends a request to the base station to be assigned multiple code channels. If the multiple code channels are granted, the mobile station uses the multiple channels for transmitting data to the base station until either the data buffer becomes empty, or a base station time-out occurs, or the mobile station is signalled by the base station to reduce its data transmission rate, whichever occurs first.

In accordance with an aspect of this invention, the mobile station is enabled to autonomously control the data rate during an assigned period for high speed transmission, so as to lower the data rate when needed for the purpose of improving coverage and/or to avoid operating in a power limited condition, thereby degrading link quality.

Aspects of this invention provide a technique to achieve a mobile station initiated discontinuous transmission on one or more of the sub-channels assigned by the base station in the multiple-channel, high speed data reverse link configuration, for the purpose of maintaining connection quality and improving coverage when operating in a power limited environment.

This invention thus teaches a mobile station that is operated in accordance with the steps of: (a) establishing a wireless data communication from a transmitter of the mobile station to a receiver of the base station at a predetermined data rate simultaneously through a fundamental data channel and at least one supplemental data channel; (b) receiving a command from the base station to increase a transmission power of the mobile station transmitter; (c) determining in the mobile station if the increased transmission power will exceed a transmission power threshold value; if so, (d) reducing the data rate by disabling data transmission through at least one supplemental data channel; and (e) increasing the transmission power.

The mobile station is further operated in accordance with the steps of: (f) receiving a command from the base station to decrease the transmission power of the mobile station; (g) determining in the mobile station if the decreased transmission power, assuming that a disabled supplemental data channel were once more enabled, will be less than the transmission power threshold value; if so, (h) increasing the data rate by enabling data transmission through at least one previously disabled supplemental data channel; and (i) decreasing the transmission power.

In a preferred embodiment of this invention the step of increasing the data rate includes a step of transmitting a resume message or preamble from the mobile station to the base station on a previously disabled supplemental code channel. The preamble can be used to assist in synchronizing (e.g., chip synchronizing) the base station to the channel prior to the resumption of data transmission on that channel.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
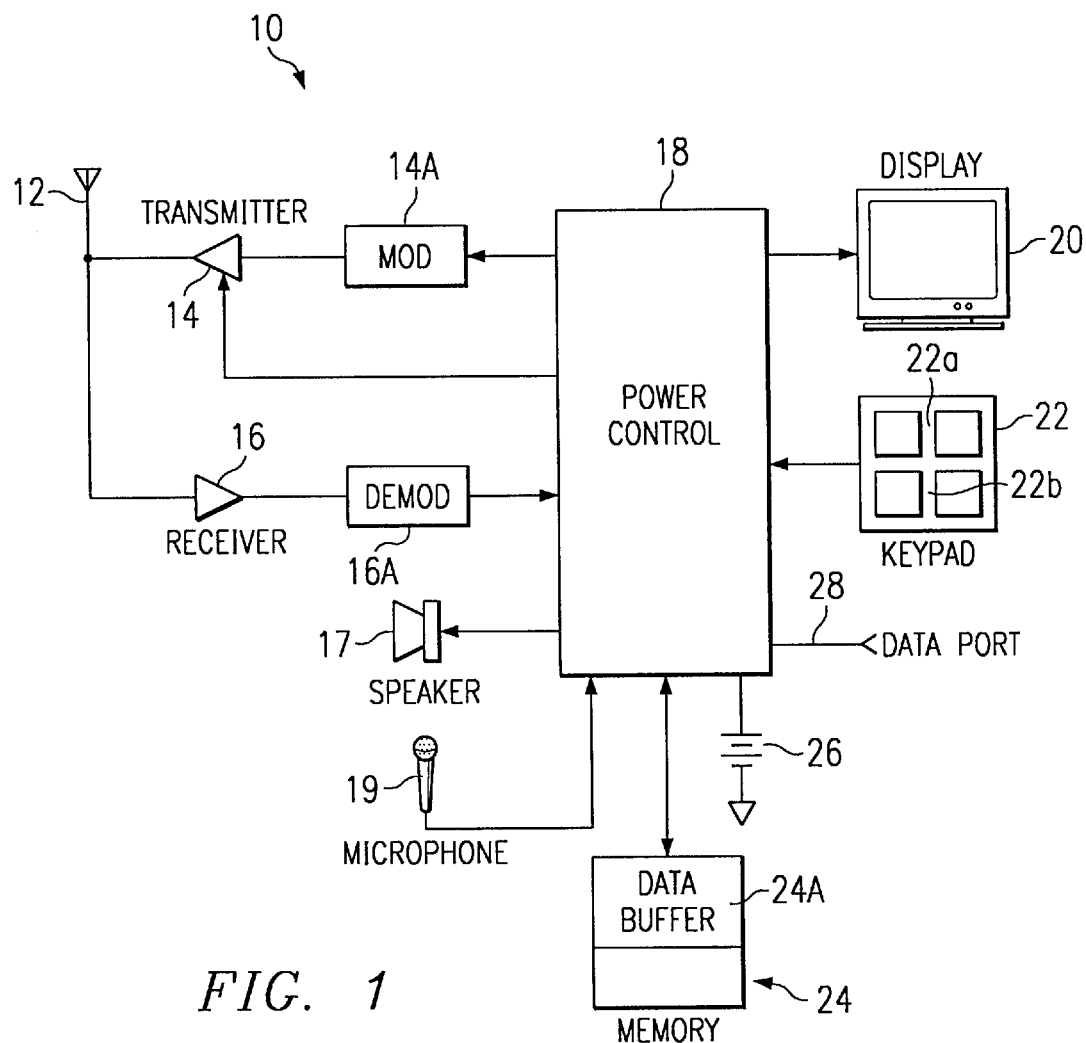
FIG. 1 is a block diagram of a mobile station that is constructed and operated in accordance with this invention.
Figure 2:
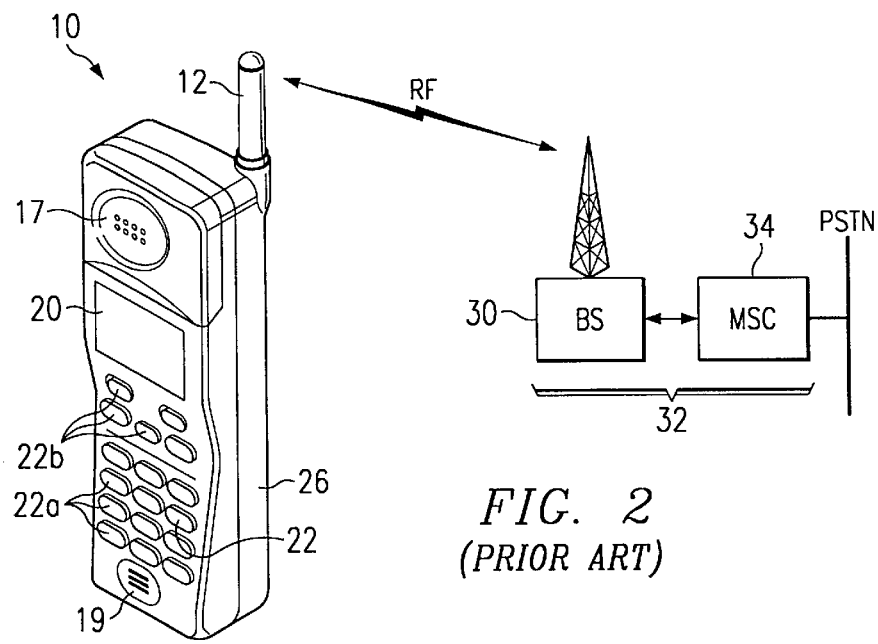
FIG. 2 is an elevational view of the mobile station shown in FIG. 1, and which further illustrates a cellular communication system to which the mobile station is bidirectionally coupled through wireless RF links.

Reference is made to FIGS. 1 and 2 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is a part of a cellular network 32 that includes a mobile switching center (MSC) 34. The MSC 34 provides a connection to landline trunks when the mobile station 10 is involved in a call.

The mobile station includes a modulator (MOD) 14A, transceiver comprised of a transmitter 14 and a receiver 16, and a demodulator (DEMOD) 16A. The mobile station also includes a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to be a CDMA-type system, such as the direct sequence (DS)

CDMA system that is specified in the above-mentioned IS-95-A standard. As such, the mobile station is assumed to be capable of receiving closed loop power control commands from the base station 30, and to further be capable of requesting multiple code channels in order to achieve a desired data transmission rate.

The teaching of this invention is not intended, however, to be limited only to this specific CDMA implementation, or to be limited for use only with an IS-95 compatible mobile station.

In general, the mobile station 10 can be a vehicle mounted or a handheld device. It should further be appreciated that the mobile station 10 can be capable of operating with one or more air interface standards, modulation types, and access types. By example, the mobile station may be a dual mode system capable of operating with both CDMA and analog (FM) systems.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station 10 are allocated between these devices according to their respective capabilities. The mobile station 10 also includes a battery 26 for powering the various circuits that are required to operate the mobile station.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the network 32 prior to the display of the messages to the user. The operating program in the memory 24 includes routines for implementing the method described below in relation to FIG. 4.

The mobile station 10 may also include a data port 28 for coupling to a source of high speed data (e.g. a facsimile machine or a PC). In some embodiments the functionality of the mobile station 10 may be incorporated within such a device. For example, at least the data transmission and reception functionality of the mobile station 10 may be provided within a plug-in card or module, such as a PCM-CIA card, and electrically connected to a PC for sending and receiving high speed data.

In general, a high speed data mobile station requests a number of parallel code channels based on information of how much data is stored in a transmit data buffer. Based on the mobile station's request, and the current interference condition in the network 32, the base station 30 assigns a number of parallel code channels, up to a maximum number corresponding to the number requested by the mobile station, for a given period of time. The period of time is typically a network 32 parameter, and is signalled to the mobile station 10 explicitly from the base station 30.

Once the multiple code channels are assigned, the mobile station 10 sends data on all assigned code channels, until the transmit buffer is empty or, in accordance with this invention, until the mobile station transmitter 14 has been commanded by the base station 30 power control loop to increase the output power beyond the mobile station's output power limit. When this occurs, the mobile station 10 determines a suitable new data rate based on the current output power of the transmitter 14, using a principle that by halving the data rate there is a gain in the link budget of approximately 3 dB. The reduction in the data rate should be sufficient such that at least one, or more if needed, of the currently assigned code channels are no longer required for transmission. The procedure for such data rate reduction is preferably part of a service option control function of a mobile station multiplex sub-layer, as described below.

The use of this invention does not exclude a method wherein the mobile station 10 originally determines the suitable requested data rate, so that the requested data rate does not exceed its power limit. However, the presently preferred embodiment of this invention, which enables autonomous control over the data rate in real time, is more dynamic in the sense that it allows the data rate to vary with the transmitter power requirement.

In the normal high speed data operation, the service option layer of the mobile station 10 controlling software is responsible for generating a number of radio link protocol (RLP) frames which contain the user data traffic. With N code channels assigned, the service option generates N frames, unless otherwise commanded by the multiplex sub-layer. In the absence of sufficient data in the transmit data buffer to form N frames, blank frames may be supplied to the multiplex layer, to indicate that discontinuous transmission (DTX) operation (i.e., no transmission at all) may take place on one or more of assigned code channels.

When the mobile station 10 applies the data rate reduction procedure in accordance with this invention, in order to maintain the connection quality when operating near the output power limit, the multiplex sub-layer may command the service options layer to generate M RLP frames, plus N-M blank frames, where M is less than N. The value of M is determined by the mobile station 10, as a function of the desired, reduced data rate.

When there is no traffic to be carried by a sub-channel, the entire transmit chain of that code channel is preferably turned off. Consequently, a fewer number of parallel code channels are in operation at the mobile station transmitter 14. However, the receiver of the base station 30 will still process all N code channels, since the base station 30 does not have knowledge that a given sub-channel has been gated off at the mobile station 10. In this case the received (null) frames of the gated off sub-channel or sub-channels are declared to be frames with insufficient quality, due to the poor signal to noise ratio, and thus passed on to the service option. However, since all valid RLP frames have their own unique RLP sequence number, the base station 30 is able to delete these "error" frames, without affecting its normal operation.

Exemplary data rates, versus the number of supplemental code channels in use, are shown in the following Table 1.

TABLE 1

| Data Rate (kbps) | No. of Supplemental Code Channels |
|---|---|
| 9.6 | 0 |
| 19.2 | 1 |
| 28.8 | 2 |
| 38.4 | 3 |
| 48.0 | 4 |
| 57.6 | 5 |
| 67.2 | 6 |
| 76.8 | 7 |

During the operation of mobile station 10 a number of variables are defined and stored in the memory 24, as described below.

Begin Preamble: A storage variable in the mobile station 10 which contains the size of a preamble which is transmitted on a Reverse Supplemental Code Channel at the beginning of a multi-channel transmission. The default and initial value is 0.

Num Rev Codes: A storage variable in the mobile station 10 which contains the number of Reverse Supplemental Code Channels which are permitted (i.e., there is no pending multi-channel reverse transmission). The default and initial value is 0.

Resume Preamble: In accordance with an aspect of this invention, the Resume Preamble is a storage variable in the mobile station 10 which contains the size of the preamble which is transmitted on a Reverse Supplemental Code Channel at the beginning of transmission on the Reverse Supplemental Code Channel when resuming transmission following an interruption caused by the mobile station 10 performing the discontinuous transmission (DTX). The default and initial value is 0. The Resume Preamble can be used to assist in synchronizing (e.g., chip synchronizing) the base station 32 to the Supplemental Code Channel prior to the resumption of data transmission on the previously disable Supplemental Code Channel.

The following definitions apply to the mobile station:

Fundamental Code Channel: A portion of a Traffic Channel (Forward or Reverse) which is always present, and which carries a combination of primary data, secondary data, signaling, and power control information.

Multi-Channel Operation: A mode of operation of either a base station or a mobile station during which Multi-Channel Transmission is occurring.

Multi-Channel Transmission: A transmission (either forward or reverse) which occurs on a Fundamental Code Channel as well as on one or more Supplemental Code Channels.

Multi-Channel Reverse Transmission: A Multi-Channel Transmission which occurs on the Reverse Traffic Channel.

A power control bit received from the base station 30 is valid if it is received in a second 1.25 ms time slot following a time slot in which the mobile station 10 transmitted (see IS-95-A, Section 7.1.3.1.8). The change in mean output power level per single power control bit is nominally 1 dB. The total changed closed loop mean output power is an accumulation of the level changes. The mobile station 10 locks the accumulation of valid level changes and ignores received power control bits related to gated-off periods when the transmitter 14 is disabled.

The total changed closed loop mean output power is applied to the total transmit power for the mobile station 10, including the Fundamental as well as all of the active Supplemental Code Channels (i.e., a closed loop output power correction will increase or decrease the transmitted energy on each code channel by a nominal 1 dB).

The change in mean output power per single power control bit is specified to be within □0.5 dB of the nominal change, and the change in mean output power level per 10 valid power control bits of the same sign is specified to be within □20% of 10 times the nominal change. A '0' power control bit implies an increase in transmit power, while a '1' power control bit implies a decrease in transmit power.

The mobile station 10 is specified to provide a closed loop adjustment range greater than □24 dB around its open loop estimate, assuming transmission on the Fundamental Code Channel only.

In accordance with an aspect of this invention, in the event that the mobile station 10 is directed by the base station closed loop power control to increase its transmit power level beyond the mobile station's transmit power capacity, the mobile station 10 immediately terminates transmission on some or all active Reverse Supplemental Code Channels (as necessary) in order to maintain the base station directed transmit power level on the Fundamental Code Channel.

Figure 3:
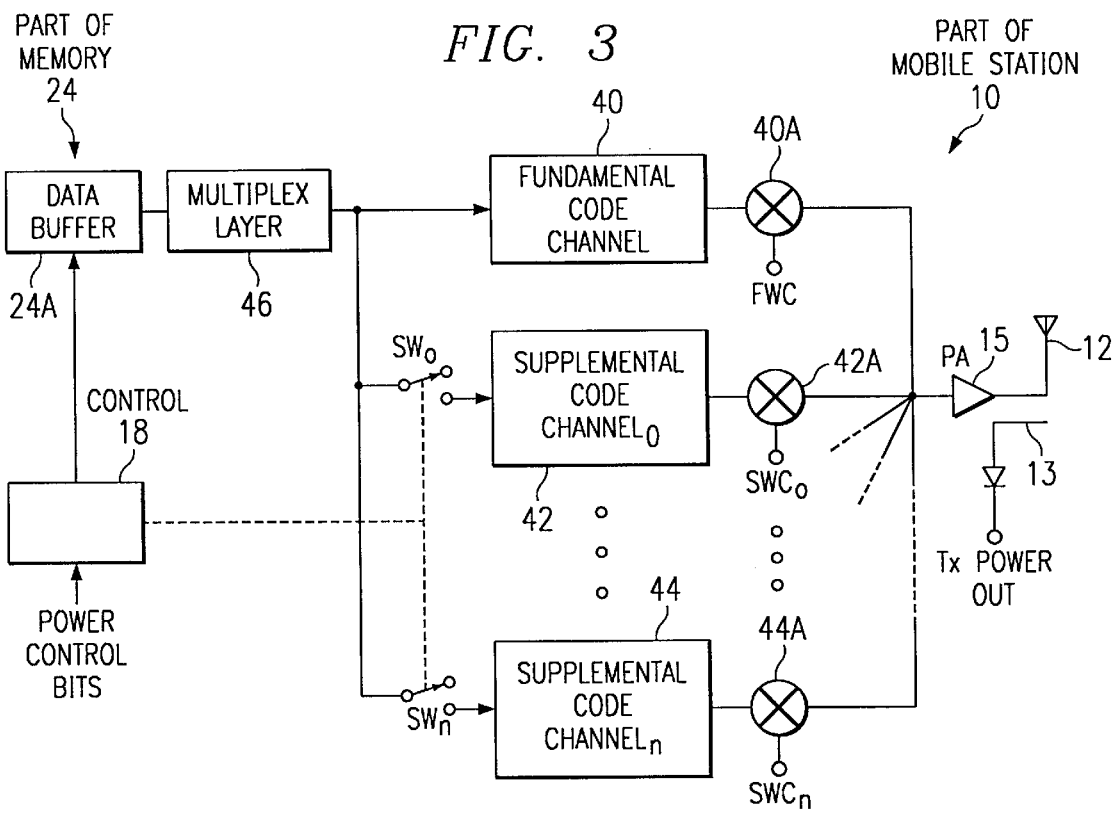
FIG. 3 is a simplified block diagram of a portion of the mobile station shown in FIGS. 1 and 2.

Reference is now made to FIG. 3 for illustrating a portion of the mobile station 10 that is of most concern to the present invention.

The memory 24 includes a data buffer 24A wherein is stored packet data prior to transmission to the network 32. Packet data is output 15 from the data buffer 24A in RLP frame format under the direction of the controller 18, and is provided to a plurality of parallel reverse code channels.

These channels are shown to be the Fundamental Code Channel (FCC) 40, at least a first Supplemental Code Channel (SCC$_0$) 42, and possibly other SCCs (e.g., up to SCC$_n$44). Each code channel is assumed to include a conventional convolutional encoder, interleaver and other circuitry as currently specified. An output of each code channel 40–44 is applied to a respective spreader 40A–44A, where the data conveyed by that channel is spread using a spreading code (e.g., a Walsh code) that was previously assigned by the network 32. These spreading codes are shown as the Fundamental Walsh Code (FWC) and as Supplemental Walsh Codes (SWC$_0$–SWC$_n$). Other spreading codes, such as a Long Code and I and Q PN codes (not shown), are typically also used to spread the signal. The end result is that each parallel data channel is spread over the available spectrum, the signals conveying the parallel data channels are then combined at summing node 46, the composite signal is phase modulated onto a carrier, up-converted to a final transmitter frequency, and is then amplified by a variable gain amplifier (not shown) and a final power amplifier (PA) 15. The PA 15 forms a part of the transmitter 14 shown in FIG. 1. Typically a directional coupler 13 is provided so as to give an indication of the actual transmitter power (TX Power Out). The amplified signal, which includes all of the parallel data channels which have been spread with the orthogonal spreading codes, is then transmitted from the antenna 12 to the base station 30 of network 32. The transmitted signal is received by the base station 30, is demodulated and then despread using the corresponding Walsh codes (FWC, SWC$_0$ . . . SWC$_n$), and any other applicable codes, in a multi-finger despreader (e.g., a RAKE receiver), and the recovered data channels are combined into the desired packet data stream. The packet data stream may be connected into a public switched telephone network (PSTN) that is connected to the MSC 34, or it may be connected to a private or public data network for routing to a destination device.

FIG. 3 also illustrates the functionality of the Multiplex Layer 46, interposed between the data buffer 24A and the code channels 40–44, which controls the number of frames that the service option generates during every 20 millisecond slot, and which are sent to the physical layer (i.e., the multiple code channels 40–44).

In accordance with an aspect of this invention the controller 18 is responsive to the power control command bits received from the base station (every 1.25 milliseconds) for reducing the effective data rate, by selectively disabling an individual one or ones of the $SCCs_{o-n}$, so as not exceed the mobile station's transmitter output power limit. This selective disabling function is shown schematically by the switches ($SW_{0-n}$) that are coupled between the output of the data buffer 24A and the inputs to the $SCCs_{0-n}$, respectively. The opening of one of the switches places the corresponding SCC into the Discontinuous Transmission (DTX) low power (DTX-Low) state, reduces the effective data rate proportionately, and thus reduces the peak to average ratio of the transmitted signal power, which is the desired result.

Figure 4:
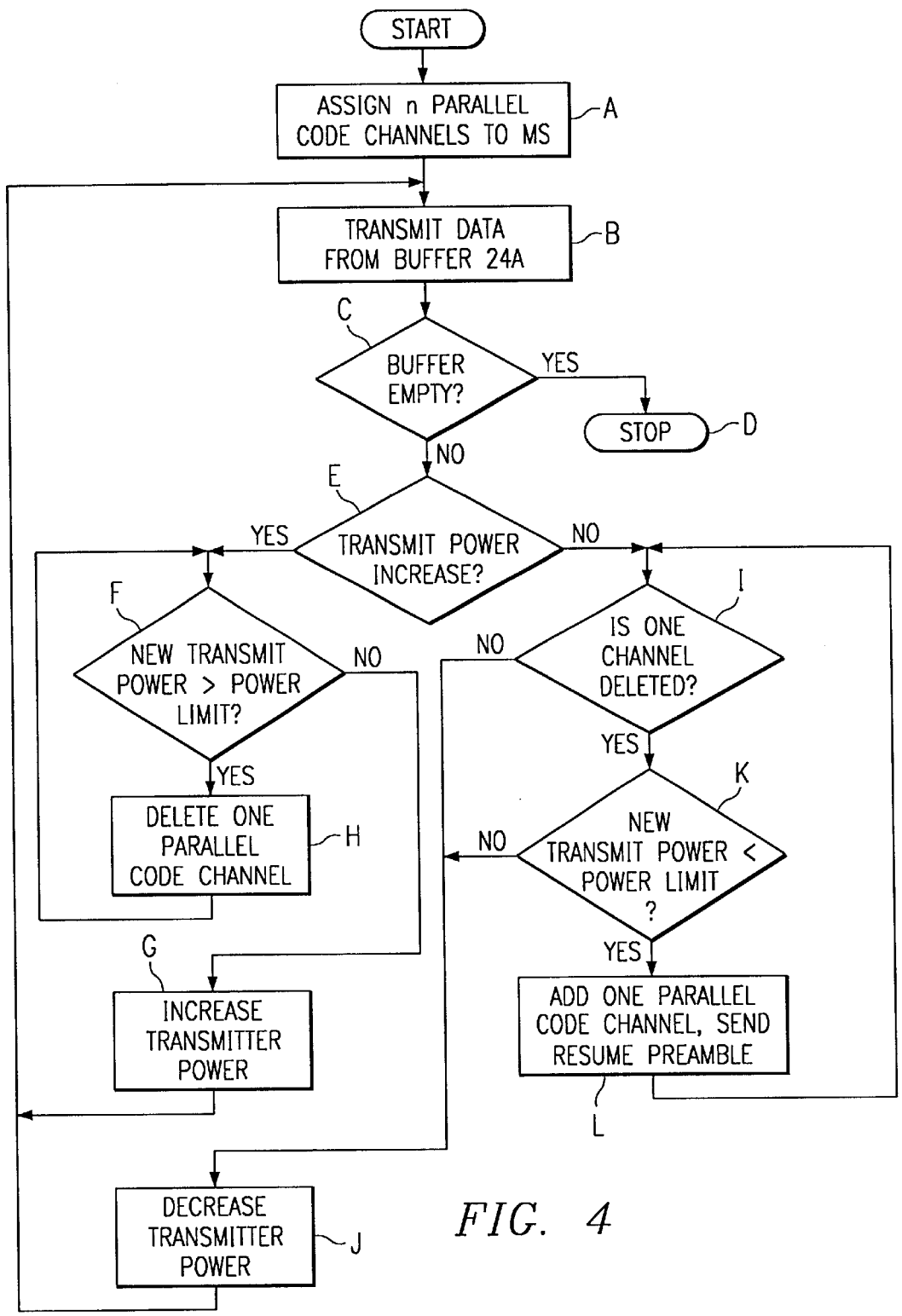
FIG. 4 is a logic flow diagram that illustrates a selective DTX method in accordance with this invention.

Referring to FIG. 4, a first method in accordance with this invention is illustrated. At Block A it is assumed that the mobile station 10 has buffered packet data in the data buffer 24A, and has requested and been assigned at least one parallel code channel corresponding to the FCC 40, at least one of the supplemental code channels (SCCs) shown in FIG. 3. At Block B a mobile station begins transmitting data from the data buffer 24A. The mobile station 10 periodically determines if the buffer 24A is empty (Block C). If yes, control passes to terminator D where the method ends. Although not shown in FIG. 4, other determinations can be made, such as whether a base station time-out has occurred, or whether the mobile station 10 has been signalled by the base station 30 to reduce its data transmission rate. If no at Block C, and assuming that a power control bit has been received from the base station 30, a determination is made at Block E if a transmitter power increase has been commanded by the base station 30. If yes, control passes to Block F where the mobile station 10 determines if the new transmitter power will exceed the output power limit of the mobile station 10.

More particularly, as part of IS-95 normal operation, the mobile station 10 maintains the following calculations:

mean output power (dBm)=-mean input power (dBm)
+offset-power (a system parameter)
+NOM_PWR-16×NOM_POW_EXT (network parameters)
+INIT_PWR (network parameter)
+the sum of all access probe corrections (dB)
+the sum of all closed loop power control corrections (dB)
+10×log 10(1+reverse_supplemental_channels)dB.

With each new power control command received from the base station 30, the mean output power is updated, and if it exceeds the mobile station's power output threshold, then the parameter reverse_supplemental_channels is reduced until the new mean output power value falls below the threshold. Alternatively, the mobile station 10 may examine the average "mean output power" values over several power control commands, in order to make a decision on whether to change the number of supplemental channels in use.

If no at Block F, control passes to Block G to increase the transmitter power by one increment (e.g., 1 dB). Control then passes back to Block B to continue transmitting data from the buffer 24A. Returning to Block F, if it is determined that the new transmit power will exceed the output power limit, control instead passes to Block H to delete one parallel code channel, thereby effectively reducing the transmission data rate by an amount carried that code channel (e.g., 9.6 kbps). This can be accomplished by "opening" the associated switch, thereby placing the corresponding supplemental code channel in the DTX-Low state. For the purposes of this invention, it can be assumed that placing one of the supplemental code channels into the DTX-Low state provides an increase in the link budget. For example, dropping one half of the supplemental channels in use provides an increase in link budget of about 3 dB.

Control then passes back to Block F to determine, based on the current number of active code channels, whether the newly commanded transmitter power will still exceed the mobile station's output power limit. While in most cases this will not be the case, the method can loop between Blocks F and H until a sufficient number of supplemental code channels have been placed in the DTX-Low state so as to have reduced the transmitted power below the mobile station's output power limit. Control eventually passes to Block G and then back to Block B to continue transmitting data from the buffer 24A, but at the reduced data rate.

Returning to Block E, if it is determined that the last received power control bit instead commands a transmitter power decrease, control passes to Block I where a determination is made if at least one supplemental code channel has been previously deleted (i.e., placed in the DTX-Low state). If no, control passes to Block J to decrease the transmitter power by one increment (e.g., 1 dB) and then to Block B. If it is instead determined at Block I that at least one supplemental code channel has been previously deleted, control passes to Block K to determine if the newly commanded, lower transmitter power, assuming that one supplemental code channel were to be reactivated, will be less than the mobile station's output power limit. The threshold used by Block K (data rate increase) may or may not the same threshold as used by Block F (data rate reduction). A different threshold may be preferred if the mobile station is to avoid frequent dropping and adding back of supplemental channel(s) when it operates near to the power limit threshold. The use of different thresholds thus provides some degree of hysteresis.

If no At Block K, control passes to Block J to decrease the transmitter power and then to Block B. If it is instead determined at Block K that the addition of one, currently deactivated supplemental code channel will not increase the newly commanded transmitter power beyond the power limit, control passes to Block L to add one of the previously deleted supplemental code channels (by "closing" the associated switch), and to then transmit the above-described Resume Preamble to the base station 30 on the reactivated SCC. Control then passes back to Block I to determine if another supplemental code channel has been previously deleted. The method can thus loop, adding supplemental code channels, until it is determined that either no further previously deleted SCCs are available to add, or that the addition of another SCC would cause the output power level to exceed the maximum allowable output power level. The method eventually transitions back through Block J to decrease the transmitter power by one increment, as commanded by the base station 30, and then to Block B to continue transmitting data from the buffer 24A until the buffer is determined to be empty at Block C.

Figure 5:
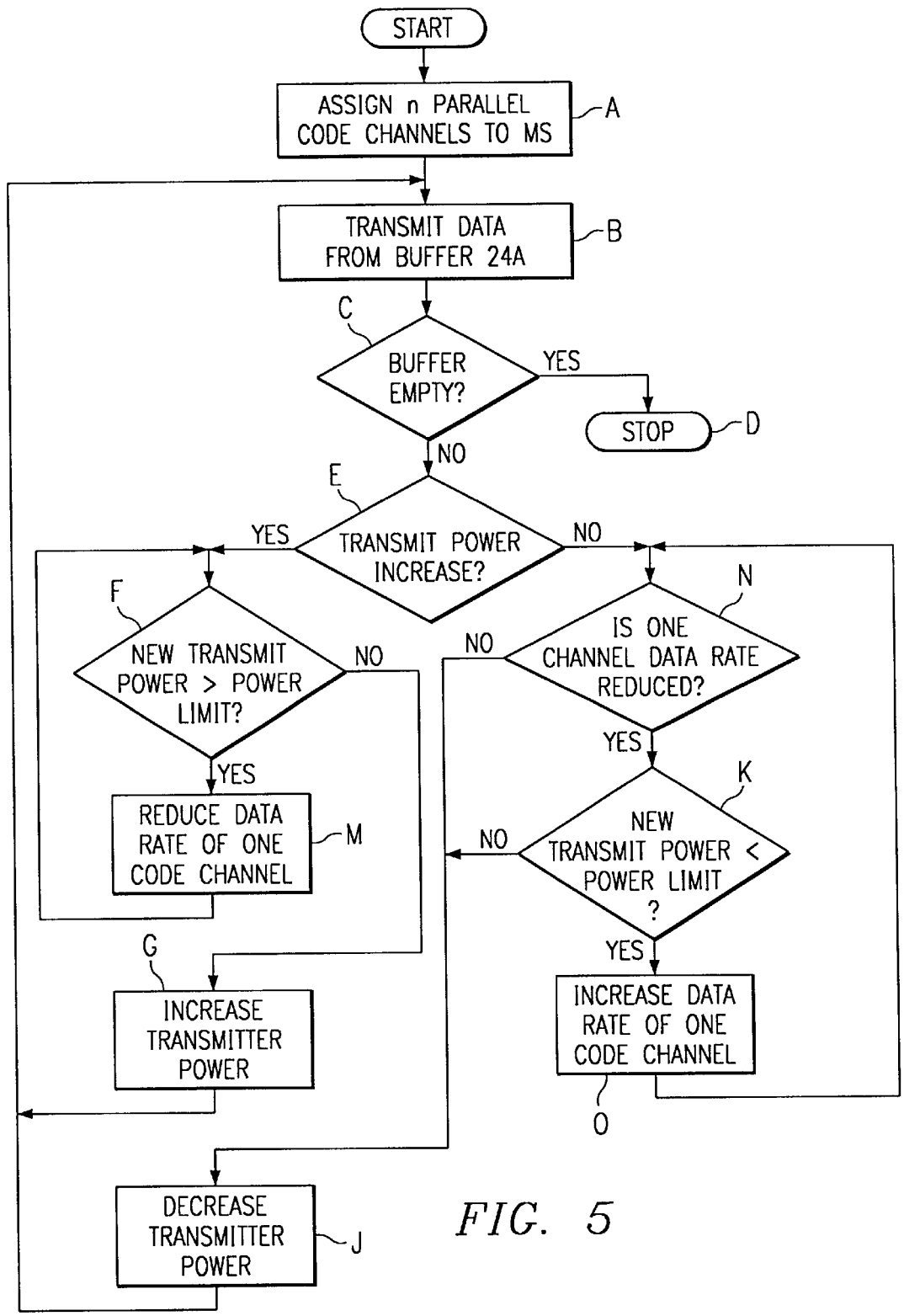
FIG. 5 is a logic flow diagram that illustrates a selective data rate reduction method in accordance with this invention.

FIG. 5 illustrates a further method in accordance with this invention. In FIG. 5 Blocks H, I and L differ from the embodiment of FIG. 4. In Block A it is assumed the value of n may be equal to or greater than 1. That is, this method applies to the case where the mobile station 10 operates with only one reverse code channel, or with the fundamental and one or more supplemental code channels.

At Block F, after a transmitter power increase is commanded at Block E, and if it is determined that the new power limit exceeds the power limit threshold, then control passes to Block H as before. However, at Block H the mobile station 10 reduces the channel data rate by some increment (e.g., by one half). For example, if the fundamental or one of the supplemental data channels is operating at 9.6 kbps, the mobile station reduces the data rate to 4.8 kbps. Control then passes back to Block F to determine if the reduced data rate causes the transmitted power to fall below the power limit. If not, the channel's data rate can be reduced again at Block H. This process can continue until the data rate is reduced below some predetermined minimum value, at which time the code channel is disabled as in the embodiment of FIG. 4.

If a transmitter power decrease is commanded at Block E, control passes to Block I to determine if the data rate of one code channel (the fundamental or one of the supplemental code channels) was previously reduced at Block H. If yes, control passes to Block K to determine if increasing the data rate through that code channel will cause the transmitter power, based on the newly commanded decrease, to still be below the power limit threshold. If yes, control passes to Block L to increase the data rate by one increment (e.g., from 2.4 kbps to 4.8 kbps), and then to Block I to determine if the channel's data rate is still reduced from the original data rate. The method can loop through Blocks I, K and L until either the data rate is restored to its original value (i.e., the result of the determination at Block I is no), or it is determined that a further increase will cause the transmitter power to exceed the power limit threshold.

This embodiment of the invention assumes that the base station 30 is capable of detecting and responding to the increased or decreased data rate through a given one of the data channels. However, it is also within the scope of this invention to send a message at the current data rate, similar to the above-described Resume Preamble, to affirmatively notify the base station 30 of the impending change in data transmission rate through a given one of the channels.

Although described in the context of preferred embodiments, it should be realized that a number of modifications to these teachings may occur to one skilled in the art. By example, certain steps of the methods shown in FIGS. 4 and 5 can be executed in other than the order shown, while still obtaining the same result.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a mobile station having an output power limit, the method comprising the steps of:

establishing a wireless data communication from a transmitter of the mobile station to a receiver of the base station at a predetermined data rate simultaneously through at least one channel;

receiving a command from the base station to increase a transmission power of the mobile station transmitter;

determining in the mobile station if the increased transmission power on at least one data channel will exceed the output power limit of the mobile station;

if so, reducing the data rate by disabling data transmission through at least one of the at least one data channel;

increasing the transmission power on any of the at least one data channel that carry data transmissions after the step of reducing the data rate is performed;

receiving a command from the base station to decrease the transmission power of the mobile station;

determining in the mobile station if the decreased transmission power, assuming that a disabled data channel were once more enabled, will not exceed the output power limit of the mobile station;

if so, increasing the data rate by enabling data transmission through at least one previously disabled data channel; and decreasing the transmission power on any of the at least one data channel that carry data transmissions after the step of increasing the data rate is performed.

2. A method as in claim 1, wherein the step of increasing the data rate includes a step of transmitting a message from the mobile station to the base station for indicating that transmission is being resumed through the at least one previously disabled data channel.

3. A method for operating a mobile station having an output power limit, the method comprising the steps of:

requesting the base station for N data channels based at least in part on a desired mobile station data transmission rate;

receiving up to N distinct spreading codes from the base station for use in transmitting on up to N data channels;

receiving a command from the base station to increase a transmission power of the mobile station transmitter;

determining in the mobile station if the increased transmission power on the N data channels will exceed the output power limit of the mobile station;

if so, reducing the data rate by disabling data transmission through at least one of the N data channels; and increasing the transmission power on any of the N data channels that carry data transmissions after the step of reducing the data rate is performed.

4. A method for operating a code division, multiple access (CDMA) mobile station, comprising the steps of:

requesting a base station for N data channels based at least in part on a desired mobile station data transmission rate;

receiving up to N distinct spreading codes from the base station for use in transmitting up to N data channels;

establishing a wireless data communication from a transmitter of the mobile station to a receiver of the base station at a predetermined data rate using the received distinct spreading codes, the wireless data communication being simultaneously conducted through a fundamental code channel and at least one supplemental code channel;

receiving a first closed loop power control command from the base station, the first closed loop power control command requesting an increase in transmission power of the mobile station transmitter;

determining in the mobile station if the increased transmission power will exceed an output power limit of the mobile station;

if so, terminating data transmission through at least one of the at least one supplemental code channel and increasing the transmission power on the fundamental data channel and any of the at least one supplemental code channel that carry data transmissions after the step of terminating data transmission is performed;

receiving a second closed loop power control command from the base station, the second closed loop power control command requesting a decrease in transmission power of the mobile station transmitter;

determining in the mobile station if the decreased transmission power, assuming that data transmission through at least one previously terminated supplemental code channel is resumed, will not exceed the output power limit of the mobile station;

if so, resuming data transmission through at least one previously terminated supplemental code channel by first transmitting a message from the mobile station to the base station over the resumed supplemental code channel for indicating that transmission is being resumed through the at least one previously disabled supplemental data channel; and decreasing the transmission power on the fundamental data channel and any of the at least one supplemental code channel that carry data transmissions after the step of resuming data transmission is performed.

5. A method as set forth in claim 4, wherein the first step of determining uses a first output power limit of the mobile station, wherein the second step of determining uses a second output power limit of the mobile station, and wherein the first output power limit of the mobile station does not equal the second output power limit of the mobile station.

6. A mobile station for operation in limited power conditions, wherein the mobile station has an output power limit, the mobile station comprising:

a transceiver for transmitting on at least one data channel to a base station at a predetermined data rate, said transceiver further for receiving a command from the base station to increase a transmission power of the transceiver and for receiving a command from the base station to decrease the transmission power of the transceiver; and, a controller coupled to the transceiver, the controller for determining if an increased transmission power of the transceiver on the at least one data channel will exceed the output power limit of the mobile station, said controller further for causing, if the increased transmission power on the at least one data channel will exceed the output power limit of the mobile station, the transceiver to reduce the data rate by reducing data transmission through at least one of the at least one data channel and, causing the transceiver to increase the transmission power on any of the at least one data channel that carry data transmissions after the data rate is reduced and the controller further for determining if a decreased transmission power of the transceiver, assuming that a disabled data channel were once more enabled, will not exceed the output power limit of the mobile station and causing, if the decreased transmission power will not exceed the output power limit, the transceiver to increase the data rate by enabling data transmission through at least one previously disabled data channel and decrease the transmission power on any of the at least one data channel that carry data transmissions after the data rate is decreased.

7. A method for operating a mobile station having an output power limit, the method comprising the steps of:

establishing a wireless data communication from a transmitter of the mobile station to a receiver of the base station at a predetermined data rate simultaneously through a fundamental data channel and at least one supplemental data channel;

receiving a command from the base station to increase a transmission power of the mobile station transmitter;

determining in the mobile station if the increased transmission power on the fundamental data channel and the at least one supplemental data channel will exceed the output power limit of the mobile station;

if so, reducing the data rate by disabling, during at least a selected interval, data transmission through at least one of the at least one supplemental data channel;

increasing the transmission power on the fundamental data channel and any of the at least one supplemental data channel that carry data transmissions after the step of reducing the data rate is performed;

receiving a command from the base station to decrease the transmission power of the mobile station;

determining in the mobile station if the decreased transmission power, assuming that a disabled supplemental data channel were once more enabled, will not exceed the output power limit of the mobile station;.

if so, increasing the data rate by enabling data transmission through at least one previously disabled supplemental data channel; and decreasing the transmission power on the fundamental data channel and any of the at least one supplemental data channel that carry data transmissions after the step of increasing the data rate is performed.

8. A mobile station for operation in limited power conditions, wherein the mobile station has an output power limit, the mobile station comprising:

a transceiver for transmitting on a fundamental data channel and at least one supplemental data channel to a base station at a predetermined data rate, said transceiver further for receiving a command from the base station to increase a transmission power of the transceiver and said transceiver further for receiving a command to decrease the transmission power of the mobile station; and a controller coupled to the transceiver, the controller for determining if the increased transmission power on the fundamental and the at least one supplemental data channel will exceed the output power limit of the mobile station, said controller further for causing, if the increased transmission power on the fundamental and the at least one supplemental data channel will exceed the output power limit of the mobile station, the transceiver to reduce the data rate by reducing data transmission through at least one of the at least one supplemental data channel and, causing the transceiver to increase the transmission power on the fundamental data channel and any of the at least one supplemental data channel that carry data transmission after the data rate is reduced, said controller further for determining if the decreased transmission power, assuming that a disabled supplemental data channel were once more enabled, will not exceed the output power limit of the mobile station and causing, if the decreased transmission power will not exceed the output power limit, the transceiver to increase the data rate by enabling data transmission through at least one previously disabled supplemental data channel and decrease the transmission power on the fundamental data channel and any of the at least one supplemental data channel that carry data transmissions after the data rate is decreased.

* * * * *